United States Patent
Bi et al.

(10) Patent No.: US 8,542,195 B2
(45) Date of Patent: Sep. 24, 2013

(54) METHOD FOR OPTIMIZATION OF SOFT KEYBOARDS FOR MULTIPLE LANGUAGES

(75) Inventors: Xiaojun Bi, Toronto (CA); Barton A. Smith, Campbell, CA (US); Shumin Zhai, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 12/750,254

(22) Filed: Mar. 30, 2010

(65) Prior Publication Data

US 2011/0242000 A1    Oct. 6, 2011

(51) Int. Cl.
*G06F 3/02* (2006.01)
*G06F 3/041* (2006.01)
*G09G 5/00* (2006.01)

(52) U.S. Cl.
USPC .................... 345/171; 345/168; 345/173

(58) Field of Classification Search
USPC .............................................. 345/171
See application file for complete search history.

(56) References Cited

U.S. PATENT DOCUMENTS

| | | | | |
|---|---|---|---|---|
| 4,124,843 | A * | 11/1978 | Bramson et al. | 345/171 |
| 4,655,621 | A | 4/1987 | Holden | |
| 5,487,616 | A | 1/1996 | Ichbiah | |
| 2004/0205257 | A1* | 10/2004 | Hughes et al. | 710/1 |
| 2005/0114115 | A1* | 5/2005 | Karidis et al. | 704/10 |
| 2007/0085835 | A1* | 4/2007 | Plestid et al. | 345/171 |
| 2008/0225006 | A1 | 9/2008 | Ennadi | |

FOREIGN PATENT DOCUMENTS

JP   02006262389 A   9/2006

OTHER PUBLICATIONS

Char R. Brewbaker, "Optimizing stylus keyboard layouts with a genetic algorithm: customizatio and internationalization", www.public.iastate.edu/~crb002/ie574final.pdf <retrieved on Jan. 25, 2009>.

Eggers et al., "Optimization of the keyboard arrangement problem using an Ant Colony algorithm" European Journal of Operational Research, vol. 148, No. 3 , p. 672-686, Aug. 1, 2003.

Francis et al., "Building and Testing Optimized Keyboards for Specific Text Entry", Human Factor: v 48 , n 2 , p. 279-287 , Summer 2006.

Getschow, C.O., Rosen, M.J. and Goodenough-Trepagnier, C., A systematic approach to design a minimum distance alphabetical keyboard. *Proc. RESNA 9th Annual Conference* (1986), 396-398.

Gong, J. and Tarasewich, P., Alphabetically constrained keypad designs for text entry on mobile devices. *CHI* (2005), ACM, 221-220.

Hwang, S. and Lee, G., Qwerty-like 3×4 keypad layouts for mobile phone. *Proc. CHI* (*2005*), 1479-1482.

Kristensson, P.O. and Zhai, S., Relaxing stylus typing precision by geometric pattern matching. *IUI* (2005), 151-158.

(Continued)

*Primary Examiner* — Charles V Hicks
(74) *Attorney, Agent, or Firm* — Shimokaji & Assoc., PC (57) ABSTRACT

A method, and program product for optimizing soft keyboards with multiple languages is disclosed. The text of multiple languages may be analyzed for optimization. Constraints may be chosen for key positions on the keyboard. A mean time of inputting a character in each of the multiple languages may be calculated, which may result in mean times for inputting the character in the languages. The average of the mean times may be determined and minimized. The keys on a soft keyboard may be arranged in a manner for optimal input on the soft keyboard for the multiple languages.

20 Claims, 5 Drawing Sheets

(56) References Cited

OTHER PUBLICATIONS

Lewis, J.R. Typing-key layouts for single-finger or stylus input: initial user preference and performance, International Business Machines Corporation, Boca Raton, FL (1992).

Lewis, J.R., Kennedy, P.J. and Lalomia, M.J., Development of a Digram-Based Typing Key Layout for Single-Finger/Stylus Input. *Proc. The Human Factors and Ergonomics Society 43rd Annual Meeting* (1999).

Lewis, J.R., Kennedy, P.J. and Lalomia, M.J. Improved typing-key layouts for single-finger or stylus input, IBM Technical Report TR 54.692 (1992).

Lewis, J.R., Lalomia, M.J. and Kennedy, P.J., Evaluation of Typing Key Layouts for Stylus Input. *The Human Factors and Ergonomics Society 43rd Annual Meeting* (1999).

Lewis, J.R., Potosnak, K.M. and Magyar, R.L. Keys and Keyboards. in Helander, M.G., Landauer, T.K. and Prabhu, P.V.. *Handbook of human-computer interaction*, Elsevier Science, Amsterdam (1997), 1285-1315.

Mackenzie, I.S. and Zhang, S.X., The design and evaluation of a high-performance soft keyboard. *Proc. CHI* (1999), 25-31.

Mackenzie, I.S., Zhang, S.X. and Soukoreff, R.W. Text entry using soft keyboards. *Behaviour & Information Technology*, 18, (1999). 235-244.

Smith, B.A. and Zhai, S., Optimised Virtual Keyboards with and without Alphabetical Ordering—A Novice User Study. *Proc. INTERACT'2001* 92-99.

Soukoreff, W. and Mackenzie, I.S. Theoretical upper and lower bounds on typing speeds using a stylus and keyboard,. *Behaviour & Information Technology*, 14, (1995). 379-379.

Yamada, H. A historical study of typewriters and typing methods: from the position of planning Japanese parallels. *Journal of Information Processing*, 2, 4 (1980). 175-202.

Zhai, S. Characterizing computer input with Fitts' law parameters—The information and non-information aspects of pointing. *International Journal of Human-Computer Studies* Special Issue of Fitts (1954) $50^{th}$ Anniversary (2004).

Zhai, S., Hunter, M. and Smith, B.A., The Metropolis Keyboard—an exploration of quantitative techniques for virtual keyboard design. *Proc. The 13th Annual ACM Symposium on User Interface Software and Technology (UIST)* (2000), ACM, 119-218.

Zhai, S., Hunter, M. and Smith, B.A. Performance optimization of virtual keyboards. *Human-Computer Interaction, 17*, 2,3 (2002). 89-129.

Zhai, S., and Smith, B.A, Alphabetically Biased Keyboards are Easier to Use—Layout does matter, CHI 2001, Mar. 31-Apr. 4.

Zhai, S. and Kristensson, P.O., Interlaced QWERTY—accommodating ease of visual search and input flexibility in shape writing. *Proc. CHI* (2008), 593-596.

Zhai, S. and Kristensson, P.O. Introduction to shape writing. In MacKenzie, I.S. and Tanaka-Ishii, K. (ed). *Text Entry Systems*, Morgan Kauffman, San Francisco (2007), 139-158.

Zhai, S., Sue, A. and Accot, J., Movement model, hits distribution and learning in virtual Keyboarding. *Proc. CHI* (2002) ACM, 17-24.

\* cited by examiner

|   |   | g | v | k | z |
|---|---|---|---|---|---|
| j | d | n | a | c |   |
| f | o | i | t | h | w |
| q | u | r | e | s | y |
| x | p | m | l | b |   |

FIG. 5

METHOD FOR OPTIMIZATION OF SOFT KEYBOARDS FOR MULTIPLE LANGUAGES

BACKGROUND

The present invention relates generally to the field of optimization of soft keyboards, and more specifically, to optimizing soft keyboards for multiple languages.

Soft keyboards may also be known as virtual, touch, graphical, on-screen, or stylus keyboards. Soft keyboards may exist on touch-screen devices. Many of these keyboards may use the QWERTY layout.

It may be common for some people to use multiple languages in their daily life and work. If soft keyboards are optimized for each language specifically, multilingual people may need to switch between multiple keyboard layouts. Multiple keyboard layouts for different languages may impose extra design, deployment, and maintenance burdens on software and device makers.

Hence, there is a need for a more efficient method and program product for optimizing soft keyboards for multiple languages.

SUMMARY

According to one embodiment of the present invention, a method comprises selecting multiple languages for a keyboard to be optimized; obtaining a text corpus for each of the multiple languages; analyzing the text corpus for each of the multiple languages to obtain a digram frequency table; selecting key positions for characters on the keyboard to be optimized; selecting constraints for the key positions for the characters on the keyboard; and using the Metropolis method to determine placement for the positions of the characters on the keyboard for higher user input speed on the keyboard to be optimized, based on the digram frequency table and additional constraints.

In another embodiment of the present invention, an apparatus comprises a computing device configured to optimize a soft keyboard for multiple languages, by using a method to determine placement for the positions of the characters on the keyboard for higher user input speed on the keyboard to be optimized, based on a digram frequency table and additional predetermined constraints.

In a further embodiment of the present invention, a computer program product for optimizing a soft keyboard for multiple languages comprises a computer readable storage medium having computer readable code embodied therewith, the computer readable program code including computer readable program code that optimizes the soft keyboard for multiple languages, by computer readable program code that analyzes the correlation of the multiple languages, and uses a single basic set of characters for all of the multiple languages, with some languages having extra characters; and computer readable program code that uses the Metropolis method to determine placement for the positions of the characters on the keyboard for higher user input speed on the keyboard to be optimized, based on a digram frequency table and additional constraints.

The above and below advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims. These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention is a method for optimization of soft keyboards for multiple languages.

The present invention may simultaneously optimize keyboards for multiple languages.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which performs via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which perform on the computer or other programmable apparatus provide processes for implementing the functions/acts specified in the flowchart and/or block diagram block or blocks.

Figure 1:
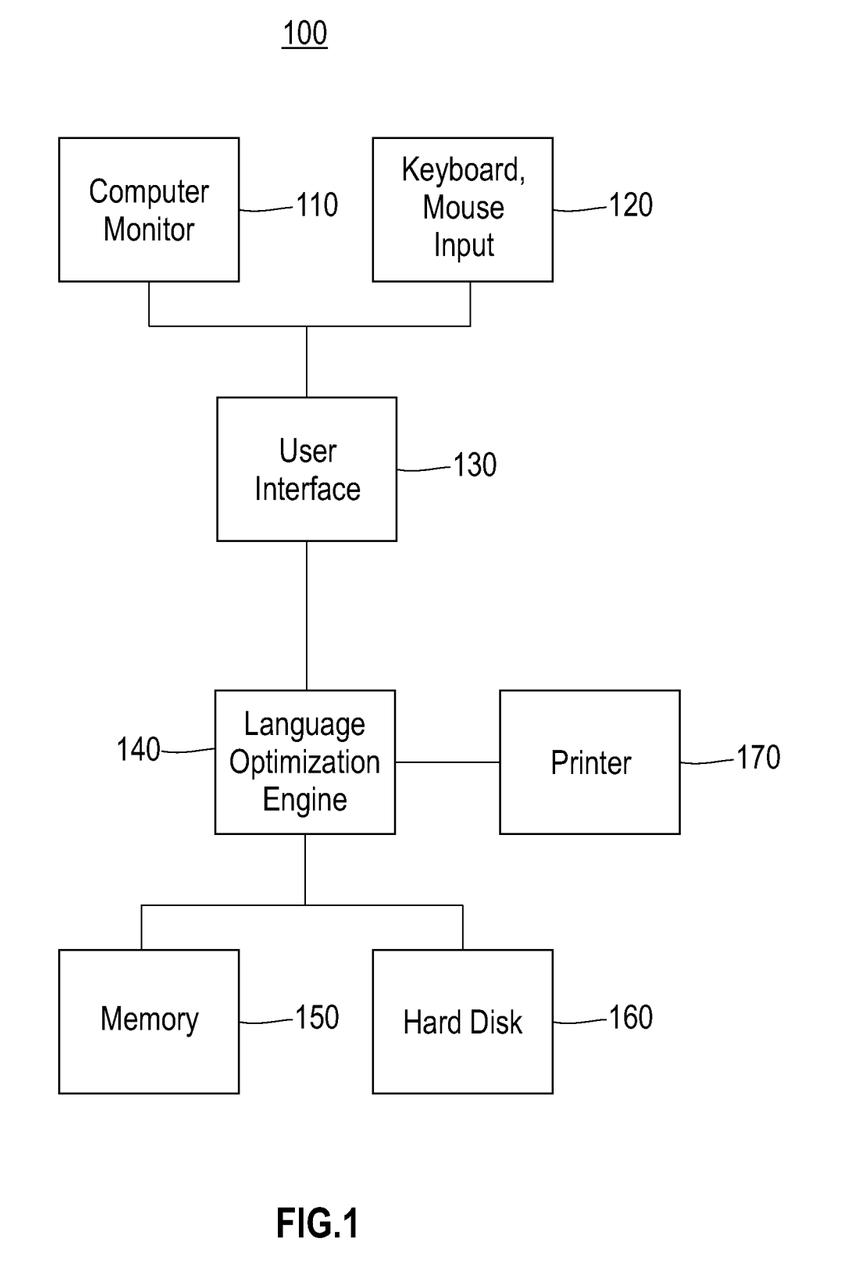
FIG. 1 is a block diagram of a system according to one exemplary embodiment of the invention.

FIG. 1 is a block diagram of a system 100 according to an exemplary embodiment of the invention. The system 100 may include a computer monitor 110, a keyboard and mouse 120, a user interface 130, language optimization engine 140, memory 150, a hard disk 160, and a printer 170. In another embodiment of the invention, the system may include at least one of: a computer, a handheld communication device, a telephone, a cellular phone, an electronic mail device, and a texting device, and a wireless device such as a radio controlled device.

A user may utilize the invention by using the user interface 130 displayed on the computer monitor 110 and operating the user interface 130 with the keyboard and mouse 120. The user may utilize the system 100 by inputting data and functions from the user interface 130 for processing by the language optimization engine 140. The user interface 130 and the processing engine 140 may be stored in computer random access memory 150 and on a hard disk 160. The user may also print operations from the user interface 130 on the printer 170.

Figure 2:
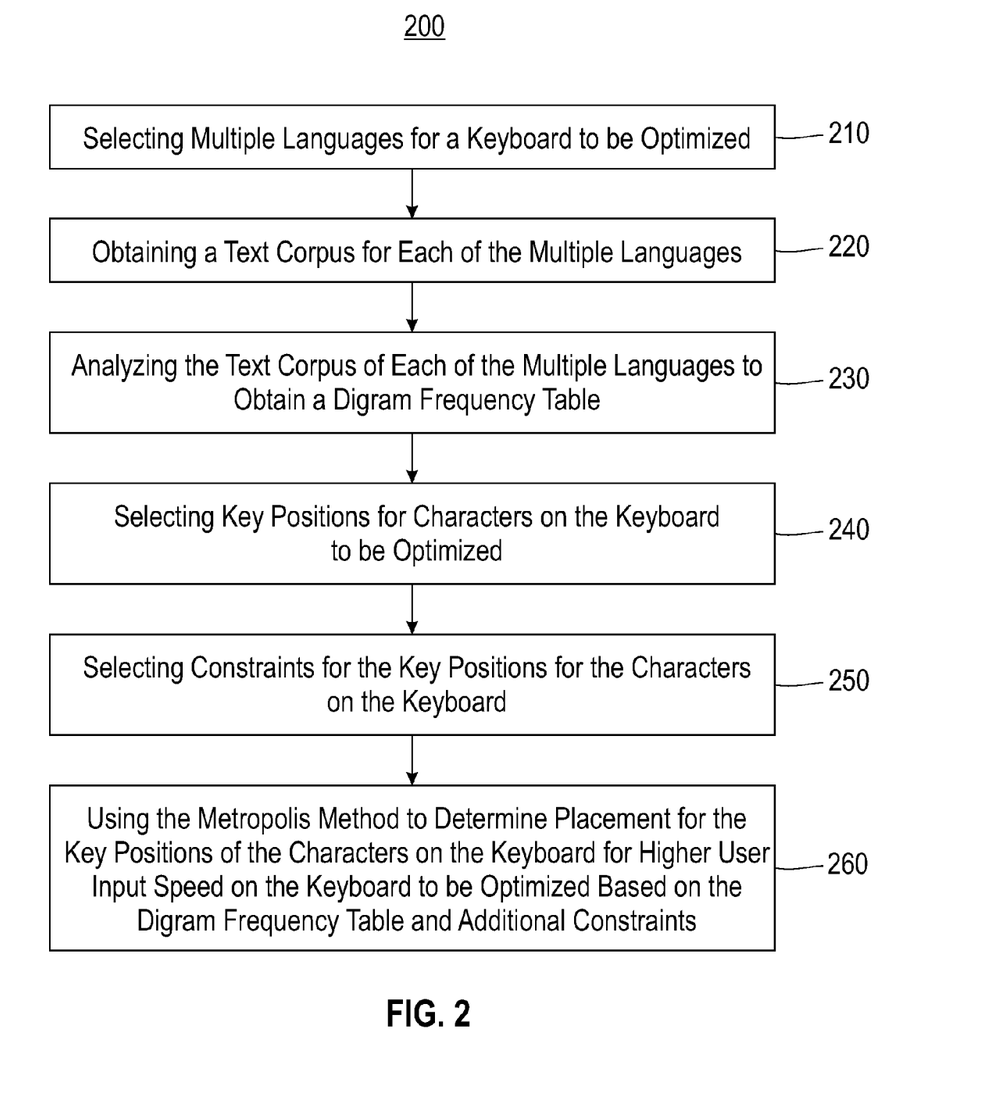
FIG. 2 is a flowchart of an exemplary embodiment of the invention using a digram frequency table.

An exemplary embodiment may include optimization of a keyboard for multiple languages as shown in FIG. 2.

Exemplary processing in the system 100 of FIG. 1 may be described with reference to FIG. 2. As shown in FIG. 2, optimization of a keyboard for multiple languages may include a step 210 of selecting multiple languages for a keyboard to be optimized. A step 220 may include obtaining a text corpus for each of the multiple languages. A step 230 may include analyzing the text corpus of each of the multiple languages to obtain a diagram frequency table. The digram frequency table may be created by analyzing each of the multiple languages and determining the frequency of a digram of two letters in a word in one of the multiple languages. The text corpus representing the body of words for each of the multiple languages may be analyzed. A step 240 may include selecting key positions for characters on the keyboard to be optimized. Selecting key positions for characters on the keyboard may be done by using the average distance traveled to type a character and the frequency of moving from one character to another as shown in the digram frequency table. A step 250 may include selecting constraints for the key positions for the characters on the keyboard. Constraints may include using a specified number of rows or columns for a keyboard, or placing the English letters on the keyboard first and then adding letters for other languages adjacent or surrounding the English letters. A step 260 may include using the Metropolis method to determine placement for the positions of the characters on the keyboard for higher user input speed on the keyboard to be optimized based on the digram frequency table and additional constraints. The Metropolis method is a random walk algorithm that searches for an optimized keyboard. The Metropolis method may calculate the mean time per character taking into consideration the frequency at which characters occur in the text of a language, and the frequency at which one specific character is proceeded by any other specific character, with both characters taken from the digram frequency table. Therefore the mean may be a weighted mean that depends on the usage of specific characters in a language. The selection of a text corpus for a language that will provide statistics representative of a language, and the calculation of the digram frequency table from the text corpus, may be used in the optimization calculations for the keyboard. The digram frequency table and any additional constraints may be used throughout each step of the Metropolis method to calculate either the input speed, the mean time per character, or the mean distance of travel between keys. All of these may be weighted means based on language statistics.

In some possible embodiments the multiple languages may comprise English and French. The multiple languages may include the languages of English, French, Spanish, and German. Other languages may be included in various combinations of languages. The method may be repeated with a different initial starting placement of characters on the keyboard. The method may be repeated with various constraints including a constraint on size, number of rows, and number of columns of keys on the keyboard. The keyboard may be simultaneously optimized for speed at the same time the keyboard is optimized for multiple languages. The keyboard may be simultaneously optimized for similarity to a QUERTY layout at the same time the keyboard is optimized for multiple languages. The keyboard may be simultaneously optimized for multiple properties of the keyboard including shape of the keyboard.

Figure 3:
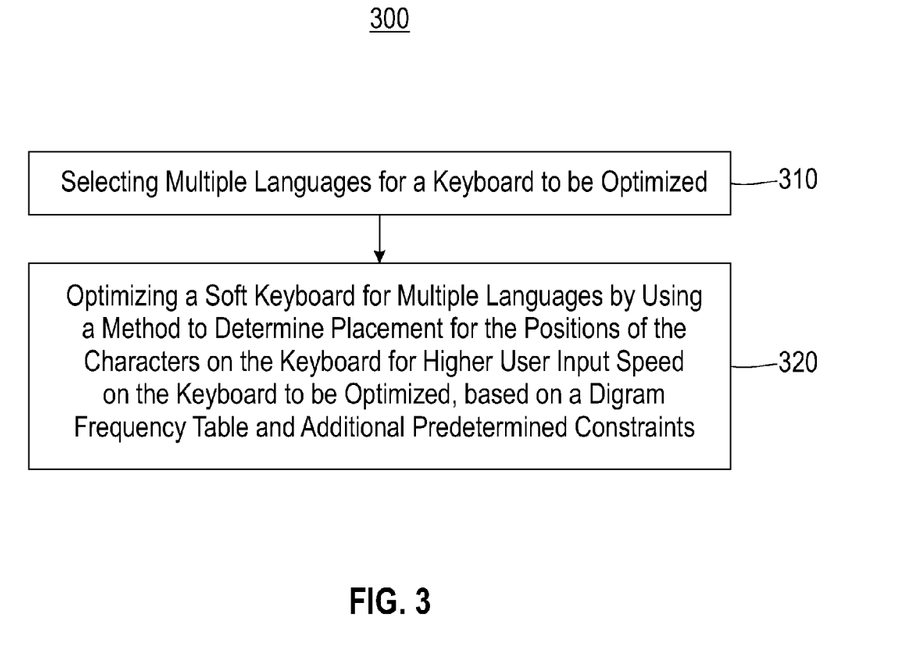
FIG. 3 is a flowchart of the exemplary embodiment of the invention of FIG. 2 using a method to determine placement positions of characters on a keyboard.

Exemplary processing in the system 100 of FIG. 1 may be described with reference to FIG. 3. FIG. 3 is an exemplary embodiment of the invention described in FIG. 2 showing a method 300 of optimizing a keyboard for multiple languages by a method of determining placement for the positions of the characters on the keyboard.

As shown in FIG. 3, a step 310 may include selecting multiple languages for a keyboard to be optimized. A step 320 may include optimizing a soft keyboard for multiple languages by using a method to determine placement for the positions of the characters on the keyboard for higher user input speed on the keyboard to be optimized, based on a digram frequency table and additional predetermined constraints. In one embodiment, the method may be the Metropolis method.

In some embodiments showing the process of FIG. 3, the optimization method for inputting a character to a soft keyboard in each of the multiple languages may include determining placement for the positions of the characters by applying the Fitts-digraph model to at least one of the characters. The optimization method may minimize an average of the mean times to input a character to the soft keyboard by applying the Metropolis algorithm to the average of mean times and minimizing the average of the mean times. A soft keyboard may be designed such that auxiliary keys other than the twenty-six English letters may be placed surrounding the twenty-six English letters. Non-English letters from another language may be placed surrounding the English letters. The soft keyboard may be designed such that the letters are placed in a pattern with five rows and six columns.

In some embodiments showing the process of FIG. 3, the embodiments may include analyzing the correlation of multiple languages by reviewing letter and digram frequency distributions of the languages in addition to reviewing correlation coefficients of letters and digram frequency distributions in each of the languages. The correlation coefficient may reflect a degree of correlation of characters of one of the languages with the characters of the other languages. A single basic set of characters may be used for all of the multiple languages. Some of the languages may have extra characters not in the other languages.

Figure 4:
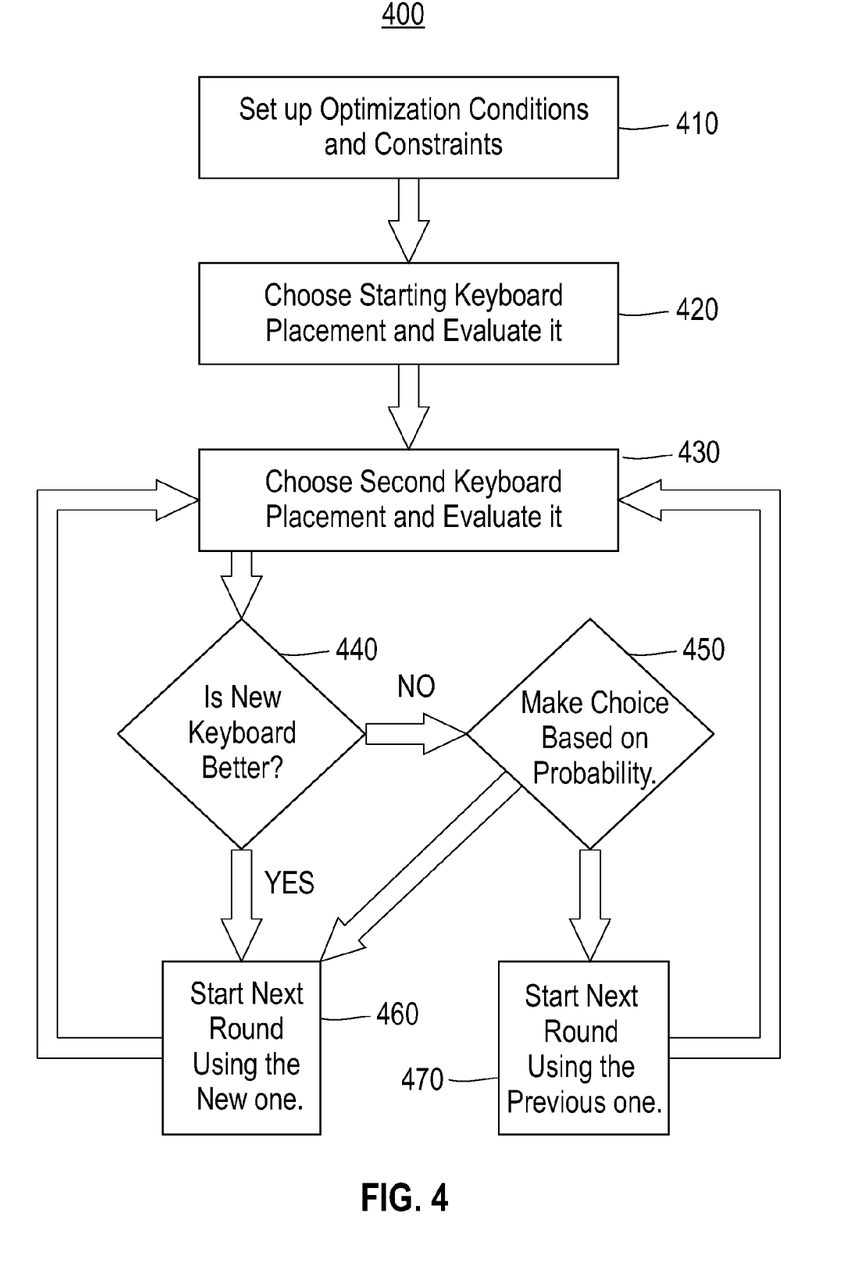
FIG. 4 is a flowchart showing processing of the embodiment invention of FIG. 2.

Exemplary processing in the system 100 of FIG. 1 may be described with reference to FIG. 4. FIG. 4 is a flowchart that further describes the invention described in FIG. 2.

Figure 5:
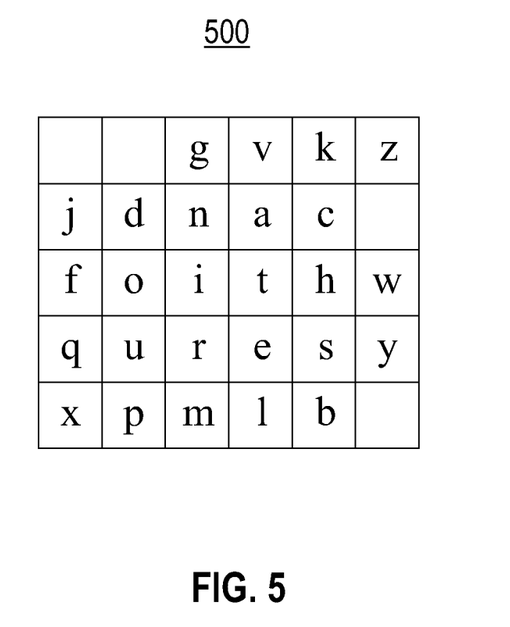
FIG. 5 shows an example design of a keyboard for English and French using the optimization method of the invention.

As shown in FIG. 4, a step 410 may include setting up optimization conditions and constraints. Constraints may include using a specified maximum number of rows or columns for a keyboard. A step 420 may include choosing starting keyboard placement using a method such as the Metropolis method. A step 430 may include choosing a second keyboard placement using a method such as the Metropolis method. A step 440 may include determining if the new keyboard placement (second keyboard placement) is a better placement than the starting keyboard placement. This may be done by determining in a step 450 if the second keyboard placement results in a probability of a lower speed by having a lower average input speed for moving between two characters in the words of a specified language. A step 460 may include repeating the optimization process with the new keyboard placement used as the starting keyboard placement if the new keyboard placement is better than the starting keyboard placement. A step 470 may include repeating the optimization process with the keyboard placement used previous to the starting keyboard placement as the starting keyboard placement. FIG. 5 shows an example design of a keyboard for English and French using the optimization method of the invention.

In some embodiments, non-English keys may be included on a soft keyboard using preparation keys. A preparation key may be a specific key on a keyboard which does not generate a character when struck, but modifies the character generated by the key struck immediately after. The user may type the base character after striking the preparation key to input an accented letter. For example, the key strokes ~ and n may result in the character ñ.

In some embodiments, non-English keys may be added as additional keys on the keyboard. Punctuation marks may be placed onto the keyboard surrounding English characters. Certain keys such as the space key and period key may be given an appearance distinct from the other keys for ease of use.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claims.

What is claimed is:

1. A method comprising:
   selecting multiple languages for a keyboard;
   obtaining a text corpus for each of the multiple languages; and
   obtaining, for each of the multiple languages, a mean time to input each of a plurality of characters in the text corpus to the keyboard for one of the multiple languages;
   simultaneously optimizing the keyboard for the selected multiple languages by:
      analyzing the text corpus for each of the multiple languages to obtain a digram frequency table;
      selecting key positions for characters on the keyboard based on an average distance traveled to type one of the characters and a frequency of moving from one of the characters to another one of the characters;
      selecting constraints for the key positions for the characters on the keyboard; and
      using a Metropolis method to average the obtained mean times to input one of the characters to the keyboard for each of the multiple languages and determine placement for the positions of the characters on the keyboard for higher user input speed on the keyboard, based on the digram frequency table and additional constraints.

2. The method of claim 1, wherein the multiple languages comprise English and French.

3. The method of claim 1, wherein the multiple languages include English, French, Spanish, and German.

4. The method of claim 1, wherein the method is repeated with a different initial starting placement of characters on the keyboard.

5. The method of claim 1, wherein the method is repeated with different constraints including constraints on size, number of rows, and number of columns.

6. The method of claim 1, wherein the method is simultaneously optimized for speed of user input.

7. The method of claim 6, wherein the method is simultaneously optimized for similarity to a QWERTY layout.

8. The method of claim 1, wherein the method is simultaneously optimized for multiple properties including shape of the keyboard.

9. An apparatus comprising:
   a computing device configured to optimize a soft keyboard for multiple languages simultaneously, by using a method to minimize an average of mean times to input a character on the soft keyboard in each of the multiple languages and thereby determine placement for the positions of the characters on the soft keyboard for higher user input speed on the soft keyboard, based on a digram frequency table, a correlation coefficient of letters between the multiple languages and digram frequency distributions of the multiple languages, and additional predetermined constraints.

10. The apparatus of claim 9, wherein the method to determine placement for the positions of the characters on the soft keyboard is an application of a Metropolis method.

11. The apparatus of claim 9, wherein the apparatus comprises at least one of: a computer, a handheld communication device, a telephone, a cellular phone, an electronic mail device, a texting device, and a radio controlled device.

12. The apparatus of claim 9, wherein the method to determine placement for the positions of the characters includes applying an application of a Fitts-digraph model to at least one of the characters.

13. The apparatus of claim 9, such that auxiliary keys other than the twenty-six English letters are placed surrounding a group of the twenty-six English letters on the soft keyboard.

14. The apparatus of claim 9, such that non-English letters are placed surrounding a group of English letters on the soft keyboard.

15. The apparatus of claim 9, wherein the letters on the soft keyboard are placed in a pattern with five rows and six columns.

16. A computer program product stored on a computer hardware storage device comprising computer readable code embodied therewith for optimizing a soft keyboard for multiple languages, the computer readable program code being configured to simultaneously optimize the soft keyboard in multiple languages by:
   obtaining, for each of the multiple languages, a mean time to input each of a plurality of characters to the soft keyboard for one of the multiple languages;
   analyzing correlation of the multiple languages based on a correlation coefficient reflecting a degree of correlation between the multiple languages, using a single basic set of characters for all of the multiple languages, with some languages having extra characters; and
   using an application of a Metropolis method to determine placement for the positions of the characters on the soft keyboard by minimizing an average of the obtained mean times to input the plurality characters on the soft keyboard for each of the multiple languages for higher user input speed on the soft keyboard, based on a digram frequency table and additional constraints.

17. The computer program product of claim 16, wherein non-English keys are included on the soft keyboard using preparation keys.

18. The computer program product of claim 16, wherein non-English keys are included as additional keys on the soft keyboard.

19. The computer program product of claim 16, wherein punctuation marks are placed surrounding English characters on the soft keyboard.

20. The computer program product of claim 16, wherein a space key and a period key are given an appearance distinct from the other keys on the soft keyboard.

\* \* \* \* \*